United States Patent [19]

Kodate et al.

[11] Patent Number: 5,521,728
[45] Date of Patent: May 28, 1996

[54] LIQUID CRYSTAL DISPLAY DEVICE WITH IMPROVED BLOCKING ABILITY OF FRAME AREA AND INCREASED PREVENTION OF ELECTROSTATIC FAILURE

[75] Inventors: Manabu Kodate, Yakohama; Shinichi Kimura, Sagamihara; Hidemine Yamanaka, Yamato; Mitsuru Ikezaki, Sagamihara, all of Japan

[73] Assignee: International Business Machines Corporation, Armonk, N.Y.

[21] Appl. No.: 385,505

[22] Filed: Feb. 8, 1995

[30] Foreign Application Priority Data

Feb. 8, 1994 [JP] Japan ................... 6-014371

[51] Int. Cl.⁶ .................. G02F 1/136; G02F 1/1345
[52] U.S. Cl. .......................... 359/59; 359/88
[58] Field of Search .......................... 359/59, 88

[56] References Cited

U.S. PATENT DOCUMENTS 5,200,847 4/1993 Mawatari et al. ................ 359/59

FOREIGN PATENT DOCUMENTS 2060141 3/1988 European Pat. Off. ............... 359/88

Primary Examiner—Anita Pellman Gross
Assistant Examiner—Fetsum Abraham
Attorney, Agent, or Firm—David Aker

[57] ABSTRACT

The present invention relates to the improvement in the frame area of the liquid display panel of a liquid crystal display device, and its object is to provide a liquid crystal display device which is enhanced in its blocking ability and the ability of the blocking area to prevent electrostatic failure. A blocking layer 12 is formed in a frame area 1 on TFT array substrate 3. The edge portions of the blocking layer 12 have overlapping areas 14 overlapping the edge portions of each of data lines 10, which are metal layers, with predetermined overlaping margin d as viewed from a direction perpendicular to the surface of the TFT array substrate 3. An insulation layer 16 is formed on the blocking layer 12 and the TFT array substrate 3. On the insulation a semiconductor layer 18 is formed. A plurality of data lines 10 is disposed on the semiconductor layer 18.

7 Claims, 4 Drawing Sheets

LIQUID CRYSTAL DISPLAY DEVICE WITH IMPROVED BLOCKING ABILITY OF FRAME AREA AND INCREASED PREVENTION OF ELECTROSTATIC FAILURE

FIELD OF THE INVENTION

The present invention is related to a liquid crystal display device, and particularly to the improvement in the frame area in the liquid crystal display panel of a liquid crystal display device.

BACKGROUND ART

Conventional liquid crystal display devices include various types of liquid crystal display devices such as an active matrix liquid crystal display device using thin film transistors (TFTs) as switching elements, and a simple matrix liquid crystal display device of STN and the like. Although these liquid crystal display devices differ in the ways they drive liquid crystal, they have in common the fact that liquid crystal is sealed between opposed glass substrates, that signal lines are disposed in a matrix form on the glass substrate, and that the liquid crystals in the vicinity of the intersecting signal lines are driven to construct display pixels.

In addition, the liquid crystal display panel of these conventional liquid crystal display devices has an image display area disposed so as to be exposed in the opening of the case covering the liquid crystal display panel, and a frame area which is the area between the edge portion of the case opening and the periphery or the image display area. The frame area is an area needed for preventing the chipping of the image display area due to the thickness of the case covering the liquid crystal display panel, for instance, when the liquid crystal display area is obliquely observed. The width of the liquid crystal display panel is about 2 to 3 mm, for instance, for a liquid crystal display device whose image display area is 10 inches in size. From a signal driver circuit provided outside the frame area, signal lines are disposed in a matrix form over the frame area into the image display area. Since the frame area is an area having no relationship to the image display and the display quality of the liquid crystal display device is degraded if light is transmitted from the frame area, it requires a blocking process.

The conventional blocking process for the frame area is described below.

The most typical method is to form a material having a blocking ability in the frame area on one or both of the opposed glass substrates of the liquid crystal display (LCD) panel. For instance, in most TFT/LCD panels, a blocking layer is formed by depositing a material having a blocking ability, for instance, a metal material such as Cr, in the frame area of an opposing substrate having a common electrode formed thereon and opposed to an array substrate having TFTs formed thereon.

However, in this method, the reflection by the blocking layer of the metal material of the opposing substrate is marked, which leads to the degradation of the display quality. In addition, it also has a problem in that the manufacturing process of the liquid crystal display device is made more cumbersome in accordance with the need for a blocking layer formation process only for blocking.

In contrast to the above described method which is general, but has problems, a method for blocking the frame area which requires no additional process for forming a blocking layer is disclosed, for instance, in the PUPA 61-32087 official gazette. The blocking methods disclosed in this official gazette and the like are as follows: (1) A blocking area is formed by extending the width of signal lines having a blocking ability passing through the frame area (for instance, metal wirings) to the vicinity of the adjacent signal lines in the frame area, (2) island-like blocking films are formed between the signal lines in the frame area by the same process as the wiring formation, and, (3) since the lateral wirings and the vertical wirings are formed in a multilayer wiring structure, blocking is performed by forming a blocking layer in which the frame area through which the lateral wirings are passing is paved with the vertical wiring formation material, forming a blocking layer in which the frame area through which the vertical wirings are passing is paved with the lateral wiring formation material. In these blocking methods, however, in methods (1) and (2), a gap must be left between the wirings and the area to be blocked to prevent short-circuiting between the wirings, there is a problem in that light leaks from this gap, and the blocking ability is incomplete. Further, in method (3), since the overlapping area of the signal lines and the paved blocking layer is large, the stray capacitance is large for the signal lines, which causes a problem in that a signal delay is caused that results in the degradation of the picture quality. In addition, since short-circuiting between the signal lines and the blocking layer is very likely to become a defect fatal to the display panel, the problem of a reduction in the manufacturing yield also occurs.

Further, in an article titled "Liquid Crystal Display" by T. Fukunaga et al., IBM Technical Disclosure Bulletin, Vol. 36, No. 5, May 1993, pp. 495–496, a method is disclosed in which a blocking layer is formed in a frame area using the wiring material for X-drive lines and Y-drive lines in a manner similar to method (2) described above, and the entire surface of the frame area is coated with a black organic material to increase the blocking ability. However, even this cannot prevent light leakage from the gap in the metal layers, which leads to a problem that higher picture quality cannot be obtained.

In addition, since the frame area is an extra area which has no relationship to the image display as described above, a protection circuit is formed using this area for preventing electrostatic failure which is a problem in the manufacture of the liquid crystal panel. Electrostatic failure, which the above-mentioned problem in the manufacture process of a liquid crystal panel and preventive measures against it will now be briefly described. Electrostatic failure is a problem particularly in the TFT/LCD (TFT liquid crystal display device). That is, since the gate wirings and the data wirings of a TFT array are electrically insulated by an insulation layer, in the manufacturing process of the display panel of a TFT/LCD, they are easily electrostatically charged for various reasons, such as friction from the wind blowing in a clean room, for instance, during a process in the clean room. When the gate lines or data lines are electrostatically charged, a voltage considerably larger than the actual driving voltage is applied to TFTs and the intersections of the wirings, causing dielectric breakdown of the insulation film, and as a result, they cannot function as switching elements or a fatal defect such as a line defect is caused.

To prevent such electrostatic failure, conventionally, for instance, a protection circuit is formed as disclosed in the PUPA 63-220289 official gazette. This is characterized in that reference potential wiring is provided and electrically connected to each signal wiring separately by a two-terminal operation switching element. This necessarily occupies a large area dedicated to the protection circuit so that the switching element has an appropriate resistance value as a protection circuit. In a circuit of this type, to prevent reduction in the manufacturing yield such as short-circuiting of the wirings, it is necessary to leave the gap of the metal layer in the vicinity of the protection circuit, conflicting with the blocking ability, and thus it cannot be formed in the frame area unless there is a blocking layer on the opposing substrate side. In consequence, this circuit must be formed outside the frame area, but it is usually difficult for various reasons to acquire such area outside the frame area.

In the protection circuit disclosed in the PUPA 62-65455 official gazette, adjacent wirings in the frame area are electrically short-circuited by a high-resistance connector. This high-resistance connector can be formed in the frame area. However, since the high-resistance connector constituting the circuit has substantially linear current-voltage characteristics, the display quality is reduced by the interaction between the signal lines if the resistance value is decreased, and the capability of preventing electrostatic failure becomes smaller. Consequently, it has a problem in that the display screen quality and the prevention of electrostatic failure become incompatible with each other.

As described above, conventional liquid crystal display devices have various problems to be solved in the blocking ability of the frame area, and the ability to prevent electrostatic failure in the protection circuit formed in the frame area.

SUMMARY OF THE INVENTION

The present invention was accomplished in recognition of the above problems, and, accordingly, it is an object of the present invention to provide a liquid crystal display device in which the blocking ability of the frame area around an image display area is increased without causing a large signal delay and the like in signal wirings.

It is a further object of the present invention to provide a liquid crystal display device in which the ability of preventing electrostatic failure is increased.

It is still a further object of the present invention to provide a liquid crystal display device in which the blocking ability of the frame area and the ability of preventing electrostatic failure are increased without increasing the manufacturing process.

The above objects are achieved by a liquid crystal display device comprising a transparent substrate having a frame area defined around an image display area, a wiring layer consisting of a plurality of metal wirings extracted over the frame area from the image display area and formed at predetermined intervals, an insulation layer formed on the wiring layer, and a plurality of island-like metal layers formed on the insulation layer between the adjacent metal wirings and having edge portions overlapping the edge portions of each of the plurality of metal wirings with a predetermined overlapping margin as viewed from a direction perpendicular to the surface of the transparent substrate.

Further, the above objectns are achieved by a liquid crystal display device further comprising, in the liquid crystal display device described above, a semiconductor layer formed under the insulation layer so as to electrically contact the plurality of metal wirings.

Further, the above objects are achieved by a liquid crystal display device characterized in that, in the liquid crystal display device described above, the plurality of metal wirings are either data lines or gate lines, and the plurality of metal layers is formed out of the metal forming either of the data lines or gate lines.

The above objects are achieved by a liquid crystal display device comprising a transparent substrate having a frame area defined around an image display area, a wiring layer consisting of a plurality of metal wirings extracted over the frame area from the image display area and formed at first intervals, a plurality of first island-like metal layers formed between the plurality of metal wirings of the wring layer in the frame area at second intervals between the adjacent metal wirings, an insulation layer formed on the wiring layer and the first metal layers in the frame area, a plurality of second island-like metal layers formed on the insulation layer on the plurality of metal wirings so as to connect to each of the plurality of metal wirings, and having edge portions overlapping the edge portions of each of the first metal layers with a predetermined overlapping margin as viewed from a direction perpendicular to the surface of the transparent substrate, and a semiconductor layer formed on the insulation layer so as to electrically contact the plurality of second metal layers.

In addition, the above objects are achieved by a liquid crystal display device characterized in that, in the liquid crystal display device described above, the plurality of metal wirings are either data lines or gate lines, the first metal layers are formed out of the metal forming the plurality of metal wirings, and the second metal layers are formed out of the metal forming either the data lines or gate lines.

The above objects are achieved by a liquid crystal display device characterized in that, in the liquid crystal display device described above, the overlapping margin has a width which is substantially identical to the overlapping precision in the manufacturing process.

Further, the above objects are achieved by a liquid crystal display device characterized in that, in the liquid crystal display device described above, a layer of a black organic material is added to the frame area.

In accordance with the present invention, since a plurality of island-like metal layers is formed in a frame area, which island-like metal layers have edge portions overlapping the edge portions of metal wirings through an insulation layer with a predetermined overlapping margin as viewed from a direction perpendicular to the surface of a transparent substrate, light being transmitted through the transparent substrate can be intercepted in the frame area by the overlapping metal wirings and metal layers.

Further, in accordance with the present invention, in the frame area, a semiconductor layer is formed on the wiring layer, the insulation layer is formed on the semiconductor layer, and the metal layers are formed on the insulation layer between the plurality of metal wirings of the wiring layer, and thus a transistor is formed in which a metal layer is used as the gate and adjacent metal wirings are used as the source or drain, whereby a circuit can be constructed in the frame area, which circuit has non linear current-voltage characteristics such that little current flows when a low voltage is applied and a large current flows when a high voltage is applied. A protection circuit can thus be formed for blocking the frame area and preventing electrostatic failure.

BRIEF DESCRIPTION OF THE DRAWINGS

FIG. 5 is a partial sectional view of the frame area of the liquid crystal display device according to an embodiment of the present invention.

DETAILED DESCRIPTION OF THE PREFERRED EMBODIMENTS

The liquid crystal display device according to an embodiment of the present invention is described using FIGS. 1 to 6.

Figure 1:
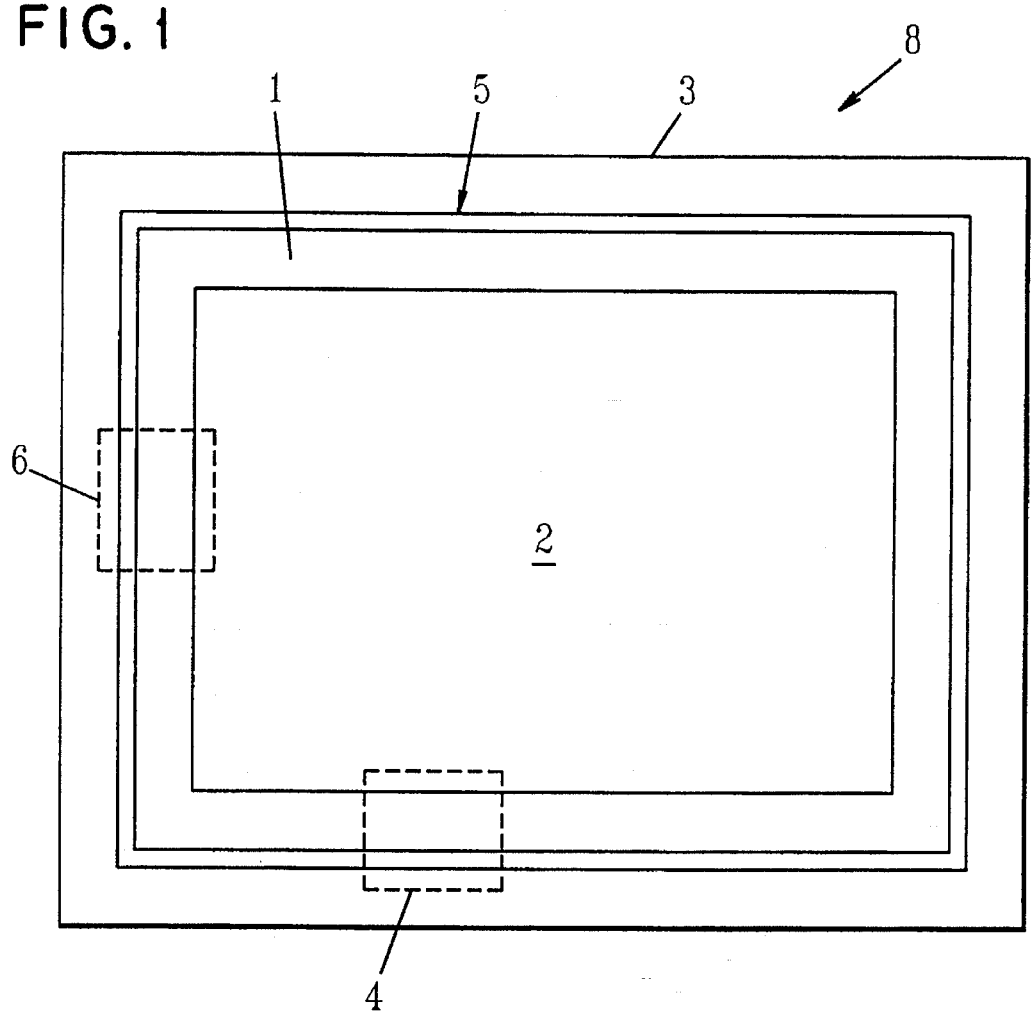
FIG. 1 shows the liquid crystal display device according to an embodiment of the present invention.

First, the construction of the liquid crystal display device of this embodiment is described using FIGS. 1 to 5. The liquid crystal display device used in this embodiment is a TFT/LCD. FIG. 1 shows the liquid crystal display panel 8 of the liquid crystal display device of this embodiment. A rectangular image display area 2 having a screen size of, for instance, 10 inches, is disposed in the center of a TFT array substrate 3 which is a transparent substrate. A frame area 1 having a width on the order of 2 to 3 mm is provided between the enter periphery of the image display area 2 and the periphery of the TFT array substrate 3.

Although not shown, a plurality of gate lines is formed from the peripheral portion of the TFT array substrate 3 into the image display area 2 passing over the frame area 1 laterally in FIG. 1, and vertically in FIG. 1, a plurality of data lines is formed from the peripheral portion of the TFT array substrate 3 into the image display area 2 passing over the frame area 1. In the intersection areas of the data lines and the gate lines, TFTs, display electrodes, and the like are disposed to form display pixels.

Through a seal material (not shown) formed in proximity to the boundary of the frame area 1 and the peripheral portion of the TFT array substrate 3, an opposing electrode substrate 5, which is a transparent electrode substrate, is disposed at a position opposed to the TFT array substrate 3. Liquid crystal is sealed between the TFT array substrate 3 and the opposing electrode substrate 5. In addition, the liquid crystal display device of this embodiment employs a transmission type display device in which light is transmitted from the back of the TFT array substrate 3 to the element side, but may employ one in which light is transmitted from the element side to the back to the substrate.

Figure 2:
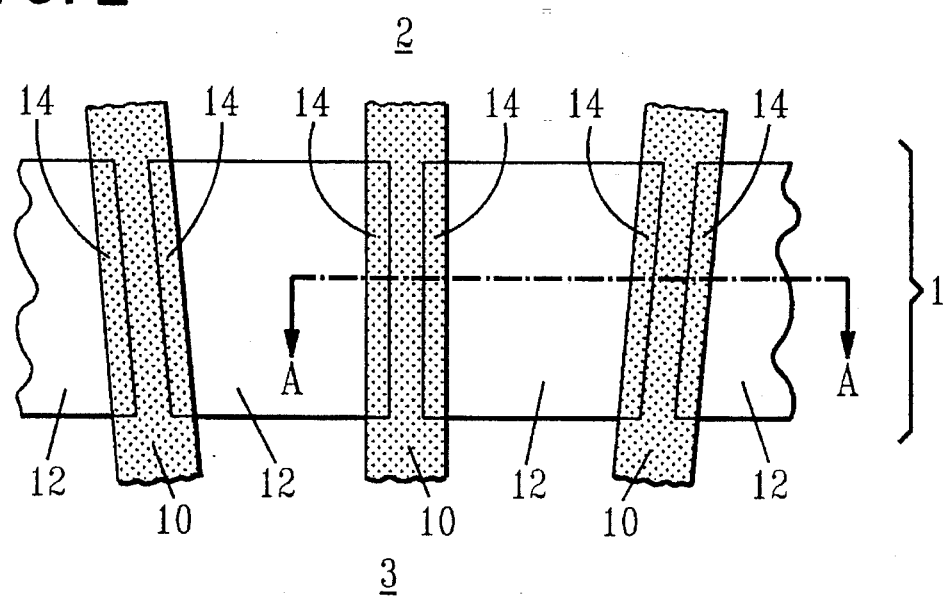
FIG. 2 is a partial enlarged view of the frame area of the liquid crystal display device according to an embodiment of the present invention.
Figure 3:
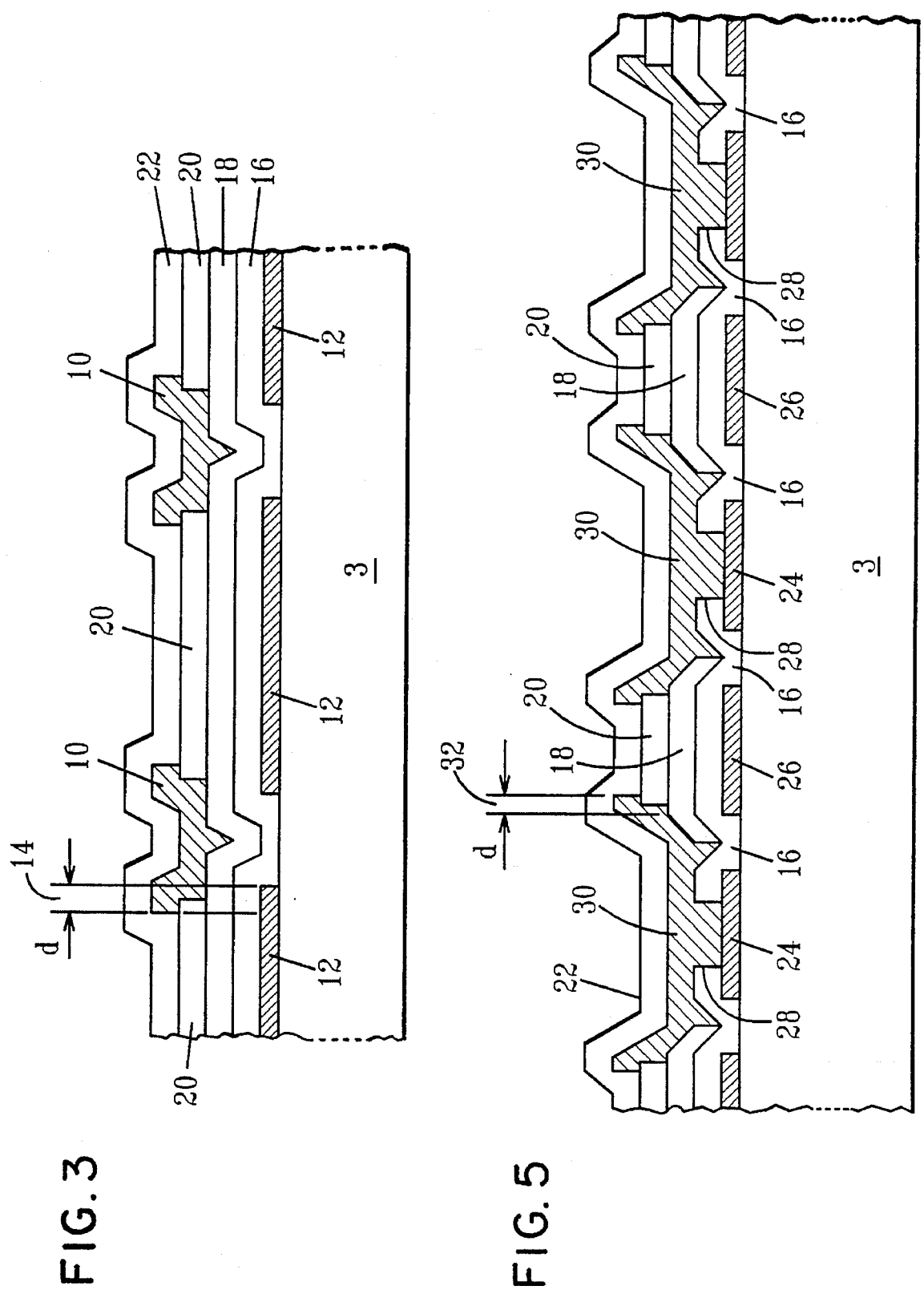
FIG. 3 is a partial sectional view of the frame area of the liquid crystal display device according to an embodiment of the present invention.

The structure of the frame area of the liquid crystal display device of this embodiment is described in detail using FIGS. 2 and 3. FIG. 2 shows an enlargement of a part 4 of the frame area 1 in FIG. 1. The part 4 of the frame area 1 is an area through which data lines are passing. FIG. 3 is a cross-sectional view along the A—A cross section of FIG. 2. The opposing electrode substrate 5 is omitted in FIG. 3.

On the frame area ! on the TFT array substrate 3 is formed a blocking layer 12 having a thickness of, for instance, about 0.3 μm. The material forming the blocking layer 12 is, for instance, a Mo alloy, Ta, Cr, Al, and the like, and preferably the metal forming the gate line is used. By using the metal forming the gate line, the blocking layer 12 can be formed in the manufacturing process simultaneously with the formation of the gate lines.

The shape arrangement of the blocking layer 12 is predetermined on the basis of the positional relationship of a plurality of data lines 10 (formed in a process after the blocking layer 12) to be described later. The blocking layer 12 is formed in the shape of islands in the frame area 1. The edge portions of the shield layer 12 have overlapping areas 14 overlapping the edge portions of each of the data lines 10, which are metal layers, with a predetermined overlapping margin, d, as viewed from a direction perpendicular to the surface of the TFT array substrate 3. The predetermined overlapping margin, d, preferably has a width which is substantially identical to the overlapping precision in the manufacturing process. If overlapping margin d is smaller than the overlapping precision, a gap may occur in the area to be blocked. In this embodiment, as shown in FIG. 2, since the individual data lines 10 are extending in the frame area 1 toward the peripheral portion of the TFT array substrate 3 so that the spacing between them become narrower, the blocking layer 12 is shaped in a parallelogram or trapezoid, but the blocking layer 12 needs only to be shaped so that it overlaps along the shape of the edge portions of each data line 10 in the frame area with a predetermined overlapping margin. In the frame area 1, the width of the data lines 10 is about 20 to 40 μm, and the spacing between the data lines 10 is about 20 to 100 μm. Overlapping margin d is about 1 to 10 μm, and the width of the blocking layer 12 in the direction substantially perpendicular to the data lines 10 is about 30 to 120 μm in the center, with the width in the direction substantially parallel with the data lines 10 being about 2 to 5 mm.

On the blocking layer 12 and the TFT array substrate 3 is formed an insulation layer 16 to a thickness of, for instance, about 0.4 μm. The formation forming the insulation layer 16 is, for instance, a Si oxide film, Si nitride film, and the like, and preferably the material forming the gate insulation film of the TFT array formed in the image display area 2 is used. By using the material forming the gate insulation film, the insulation film 16 can be formed in the manufacturing process simultaneously with the formation of the gate insulation film of the TFT.

On the insulation film 16 is formed a semiconductor layer 18 having a thickness of, for instance, about 500 Å. The material forming the semiconductor layer 18 is amorphous silicon (a-Si), for instance, and preferably the material forming the channel region of the TFT array formed in the image display area 2. By using the material forming the channel region, the semiconductor layer 18 can be formed in the manufacturing process simultaneously with the formation of the channel region of the TFT.

The plurality of data lines 10 formed in the image display area 2 is disposed on the semiconductor layer 18 in the frame area 1, and extends so as to connect to a data line driver circuit (not shown) formed in the periphery of the TFT array substrate 3. Although not shown, a P-doped a-Si layer having a thickness of about 500 Å is formed between the semiconductor layer 18 of a-Si and the data lines 10. Etching stopper layers 20 are formed between the data lines 10 on the semiconductor layer 18. On the data lines 10 and the etching stopper layers 20 is formed a passivation layer 22. These layers can also be formed simultaneously with the formation of the TFT array, and this is preferable.

Figure 4:
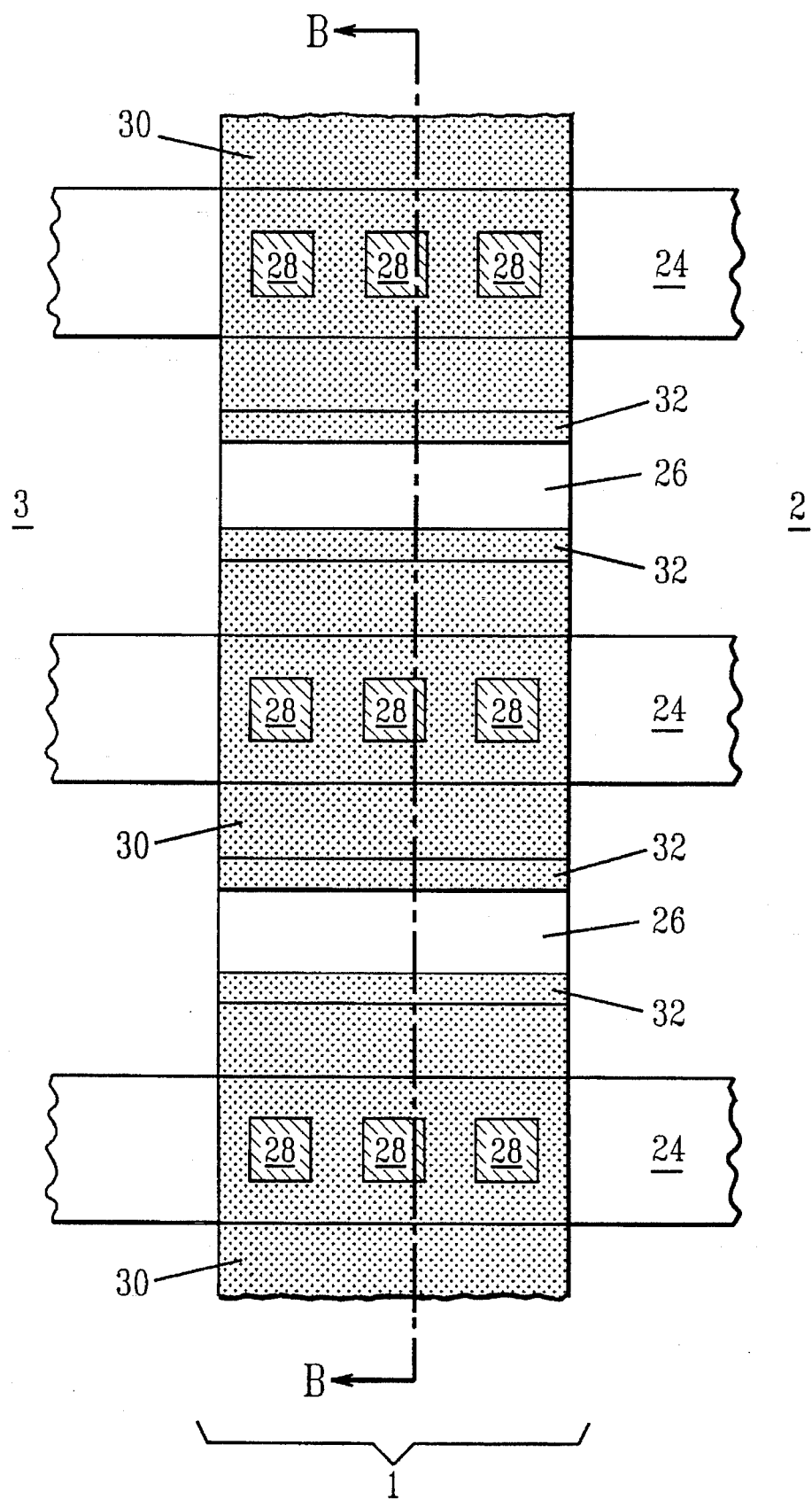
FIG. 4 is a partial enlarged view of the frame area of the liquid crystal display device according to an embodiment of the present invention.

The structure of the frame area 1 of the liquid crystal display device of this embodiment is described in detail using FIGS. 4 and 5. FIG. 4 is an enlargement of a part 6 of the frame area 1 in FIG. 1. The part 6 of the frame area 1 is an area through which the gate lines are passing. FIG. 5 is a cross-sectional view along the B—B cross section of FIG. 4 in FIG. 5, the opposing electrode substrate 5 is omitted.

A plurality gate lines 24, which are about 0.3 μm thick, about 20 to 100 μm wide, and formed out of a Mo alloy, Ta, Cr, Al, and the like, passes over the frame area 1 on the TFT array substrate 3. The distance between the gate lines 24 is about 50 to 200 μm. Between the gate lines 24 of the frame area 1 is formed a blocking layer 26 in the shape of islands out of the material forming the gate line simultaneously with the formation of the gate lines. The thickness and width of the blocking layer 26 are substantially the same values as the gate lines, and the spacing between the blocking layer 26 and the gate line 24 may be about 10 to 50 μm, which prevents short-circuiting between the two. The metal forming the gate line is preferably used as the material forming the shield layer 26. By using the metal forming the gate line as described above, the blocking layer 26 can be formed simultaneously with the formation of the gate lines in the manufacturing process.

An insulation layer 16 is formed on the gate lines 24 in the frame area 1, the blocking layer 26, and the TFT array substrate 3.

A blocking layer 30 is formed on the insulation layer 16 on the gate line 24 in the frame area 1. The blocking layer 30 and the gate line 24 are electrically connected by a through-hole 28 provided in the insulation layer 16. The material forming the blocking layer 30 is, for instance, Al, Mo, Cr, and the like, and the metal forming the data lines 10 is preferably used. By using the metal forming the data line, the blocking layer 30 can be formed simultaneously with the formation of the data lines 10 in the manufacturing process.

The shape and arrangement of the blocking layer 30 is determined in regard to the shape and position of the plurality of blocking layers 26. The blocking layer 30 is formed in the shape of islands. The edge portions of the blocking layer 30 has overlapping areas 32 overlapping the edge portions of the blocking layer 26, which is a metal layer, with predetermined overlapping margin d as viewed from a direction perpendicular to the surface of the TFT array substrate 3. Predetermined overlapping margin d preferably has a width which is substantially identical to the overlapping precision in the manufacturing process, as described above. In this embodiment, as shown in FIG. 4, each gate line 24 extends in the frame area 1 toward the periphery of the TFT array substrate 3 at a little angle with the width direction of the frame area 1, and thus the shape of the blocking layers 26 and 30 is parallelogram of trapezoid, though the blocking layers 26 and 30 may be shaped so that they are overlapping each other with a predetermined overlapping margin along the edge portions of each gate lines 24 in the frame area 1. Overlapping margin d of the overlapping area 32 is about 1 to 10 μm, the width of the blocking layer 26 in a direction substantially perpendicular to the gate lines 24 is about 10 to 100 μm, and the width in a direction substantially parallel with the gate lines 24 is about 2 to 5 mm. The width of the blocking layer 30 in a direction substantially perpendicular to the gate lines 24 is about 50 to 150 μ, and the length in a direction substantially parallel with the gate lines 24 is about 2 to 5 mm.

On the insulation layer 16 and between the shield layers 30 is formed a semiconductor layer 18 contacting the blocking layers 30, and an etching stopper layer 20 is formed thereon.

A passivation layer 22 is formed on the blocking layers 30 and the etching stopper layer 20.

In the frame area 1 over which the signal lines such as the data lines 10 or the gate lines 24 do not pass, for instance, on the right side of the frame area in FIG. 1, the metal for forming the data lines 10 or gate lines 24 may be deposited to form a blocking layer simultaneously with the formation of these wirings, or a structure in which the two metal layers overlap each other with a predetermined precision may be provided everywhere.

The blocking function of the frame area according to the liquid crystal display device of this embodiment will now be described.

As shown in FIGS. 2 to 5, in accordance with the liquid crystal display device in the present invention, the data lines and the blocking layer (FIGS. 2 and 3) or the blocking layers (FIGS. 4 and 5) overlap each other in the frame area, and thus leakage light passing through the frame area can be nearly completely intercepted.

In addition, since the overlapping area 14 for the data lines 10, which are metal wirings, and the blocking layer 12 formed out of a metal material, and the overlapping area 32 for the blocking layer 30 of a metal layer connected to the gate lines 24, which are metal wirings, and the blocking layer 26 formed out of a metal material may have a width substantially identical to the overlapping precision for the pattern formation, the signal delay in the signal lines such as the data lines 10 and the gate lines 24 can be controlled to be minimum. In consequence, in accordance with the liquid crystal display device according to this embodiment, the effect on the display quality by the signal delay can be ignored. Further, as shown in FIGS. 4 and 5, since the blocking layer 30 is a metal layer which is superposed on the gate line 24 (signal wiring) so as to be electrically connected to and in parallel with the gate line 24, it functions to reduce the resistance value of the gate line 24. Accordingly, the structure of the blocking layer 30 functions to further decrease the signal delay in the gate line 24.

Further, in such a structure as this embodiment, even if the two metal layers overlapping each other in the frame area 1, for instance, the blocking layer 12 and the two data lines 10 adjacent to the blocking layer 12 break through the insulation layer 16 and short-circuit, the redundancy is such that no practical problem occurs as long as the short-circuiting occurs between one island-like layer 12 and one of the data lines 10 adjacent to that island-like layer 12. Therefore, no problem occurs, either, in the manufacturing yield. This also applies to the blocking layers 30 and 26 connected to the gate lines 24.

Thus, in accordance with this embodiment, the whole frame area required to be blocked can fully be blocked without causing large signal delay in the signal lines.

The function of preventing electrostatic failure in the liquid crystal display device of this embodiment will now be described.

The blocking structure of the frame area 1 shown in FIG. 3 has a transistor structure as described below. That is, on the TFT array substrate 3 is formed the blocking layer 12 functioning as the gate of a transistor, and the insulation layer 16 functioning as a gate insulation film is formed thereon. The semiconductor layer 18 functioning as a channel is formed on the insulation layer 16 on the blocking layer 12 which is the gate. The semiconductor layer 18 is connected to two data lines 10 functioning as a source electrode or drain electrode through n+-a-Si (not shown). This transistor structure is repeatedly formed in a series on the upper and lower sides of the frame area 1 shown in FIG. 1, forming the protection circuit of this embodiment.

Further, the blocking structure of the frame area 1 shown in FIG. 5 forms the following transistor structure. That is, on the TFT array substrate 3 is formed the blocking layer 26 functioning as the gate of a transistor. The two gate lines 24 formed on the TFT array substrate 3 on both sides of tile blocking layer 26 are electrically connected to the upper layer thereof, and construct a source electrode or drain electrode along with the blocking layer 30 having edge portions which overlap the edge portions of the blocking layer 26 with a predetermined overlapping margin as viewed from a direction perpendicular to the surface of the TFT array substrate 3. On the blocking layer 26 as the gate is formed the semiconductor layer 18 through the insulation layer 16 functioning as a gate insulation film. The semiconductor layer 18 is connected to the blocking layer 30 which is the source-drain electrode, and functions as a channel. This transistor structure is repeatedly formed on the left side of the frame area 1 shown in FIG. 1, forming the protection circuit of this embodiment.

Figure 6:
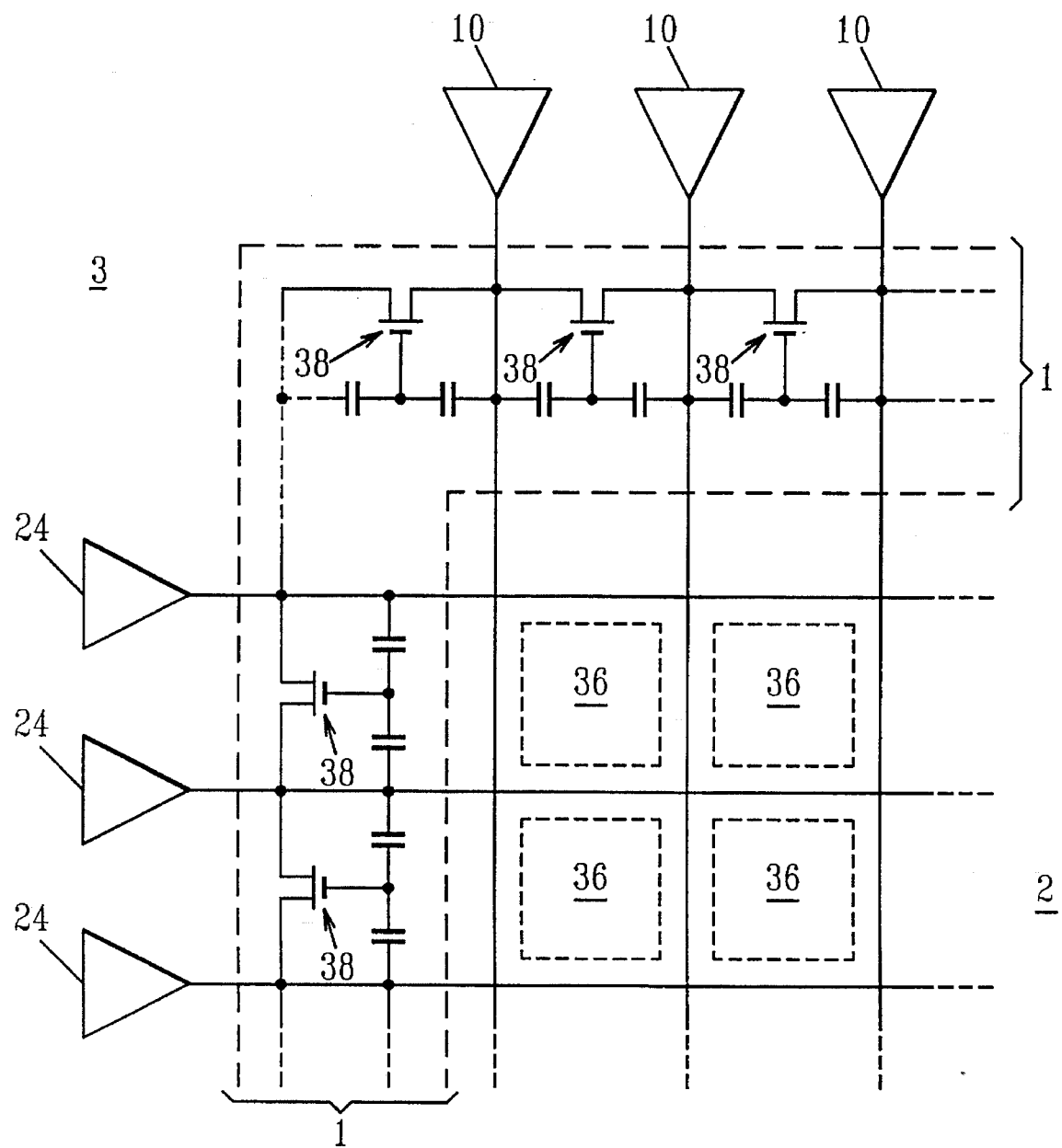
FIG. 6 is a circuit diagram showing the protection circuit of the liquid crystal display device according to an embodiment of the present invention.

Although the protection circuits formed on the upper, left, and lower sides of the frame area 1 are electrically connected to each other in this embodiment, this is not essential and the protection circuit on each side may be independent. The protection circuit formed in the frame area 1 is described using FIG. 6. FIG. 6 shows a corner portion of the frame area 1 at the upper left of the liquid display panel 8 shown in FIG. 1. In FIG. 6, the plurality of data lines of the FIG. 10 is disposed vertically over the frame area 1 into the image display area 2. In FIG. 6, the plurality of gate lines 24 of the figure is disposed laterally over the frame area 1 into the image display area 2 through the insulation layer 16 (not shown) and orthogonal to the data lines 10. Pixel areas 36 are formed in the intersection portions of the data lines and the gate lines 24 in the image display area 2. In the pixel area 36 is formed a TFT which has the drain electrode, not shown, connected to the data line 10, the gate electrode connected to the gate line 24, and the source electrode, also now shown, connected to the display electrode.

In the frame area 1 in FIG. 6, each data line 10 is connected to the source/drain electrode of the transistor 38 formed between the data lines 10. In addition, the gate electrode of the transistor 38 is capacitance-coupled to the data lines 10 on both sides. Each gate lines 24 is also connected to the source/drain electrode of the transistor 38 formed between the gate lines 24. In addition, the gate electrode of the transistor 38 is capacitance-coupled to the gate lines 24 on both sides.

The gate electrode of this transistor 38 is the blocking layer 12 shown in FIG. 3 or the blocking layer 26 shown in FIG. 5.

The protection circuit formed in the frame area 1 according to this embodiment has a structure in which a switching element is formed between each data line 10 and each gate line 24, which element has a nonlinear current-voltage characteristic such that little current flows at a low voltage, but large current flows when a high voltage is applied.

In the manufacturing process of a liquid crystal display device, if static electricity large enough to cause a failure occurs either in the data line 10 or gate line 24, a large potential difference is also produced between the capacitance-coupled blocking layer 12 or 26 (functioning as the gate in the transistor 38) by a large potential difference caused between the adjacent signal lines (data lines 10 or gate lines 24), and as a result, a large current flows in the semiconductor layer 18 of the protection circuit to reduce the potential difference between the adjacent wirings due to the produced static electricity to the threshold voltage of the transistor 38 constituting the protection circuit, whereby electrostatic failure can be prevented. The reason why a large current can be made to flow in the semiconductor layer 18 is that the width of the blocking layer 12 or 26 as the gate can be equal to the width of the frame area 1, or about 3 mm, and thus an extremely long channel width can be obtained.

Thus, the prevention of electrostatic failure according to this embodiment is achieved by the protection circuits formed in the frame area 1 and comprising switching elements having nonlinear current-voltage characteristics.

On the one hand, since substantially the entire frame area 1 can be utilized as a protection circuit for preventing electrostatic failure, electrostatic failure can be effectively prevented without reduction in manufacturing yield or display quality due to the protection circuit.

On the other hand, with the signal voltage (drive voltage) level for image display control, the potential difference between the blocking layer 12 functioning as the gate of a transistor by capacitive coupling with the data lines 10 and the data lines 10 is no more than the signal voltage amplitude and lower than the threshold voltage of the transistor 38 forming a protection circuit, and thus little current flows in the semiconductor layer 18 of the protection circuit, whereby a high screen quality can be maintained in the image display. Similarly to the scanning voltage (drive voltage) level for image display control, the potential difference between the blocking layer 26 functioning as the gate of a transistor by capacitive coupling with the gate lines 24 and the gate lines 24 is about half the potential difference between the ON and OFF states of the scan signal, and it exceeds the threshold voltage of the transistor 38 forming the protection circuit to turn on the transistor 38, but the effect on the scan signal by the current flowing in the semiconductor layer 18 of the protection circuit is negligible, so that a high quality screen can be maintained in the image display.

In addition, the wiring for supplying the potential of each pixel for stored capacity or the wiring for supplying the potential of the opposing electrode can be connected to the protection circuit shown in FIG. 6 in a manner similar to this embodiment for protection against electrostatic failure.

Thus, the frame area 1 in this embodiment has a structure which combines the blocking of the frame area 1 and the protection circuit for preventing electrostatic failure. In accordance with this embodiment, a liquid crystal display device can be implemented in which a protection circuit need not be provided outside the frame area as was done in the prior art, and the interaction between wiring signals can be ignored.

The present invention is not restricted to the above described embodiment, but various modifications can be made to it.

For instance, although, in the above embodiment, a protection circuit is formed in the frame area 1 both for blocking the frame area 1 and preventing electrostatic failure, it may be allowed to have only the blocking function without forming the semiconductor layer 18 of the frame area 1.

In addition, in the above embodiment, as shown in FIGS. 3 and 5, the blocking layer 12, the insulation layer 16, the semiconductor layer 18, and the data lines 10 are formed on the TFT array substrate 3 in this order, and hence the gate lines 24 and the blocking layer 26, the insulation layer 16, the semiconductor layer 18, and the blocking layer 30 are formed in this order, but they may be formed in a reverse placement order for correspondence to the structure of the TFT formed in each pixel 36. That is, on the TFT array substrate 3, the data lines 10, the semiconductor layer 18, the insulation layer 16, and the blocking layer 12 may be formed in this order, and the blocking layer 30, the semiconductor 18, the insulation layer 16, and the gate lines 24, and the blocking layer 26 may be formed in this order.

Furthermore, it is, of course, possible that the data lines 10 shown in FIG. 3 are changed to gate lines or the gate lines 24 shown in FIG. 5 are changed to data lines, depending on the structure of the TFT to be formed.

In addition, to make the blocking effect more complete, a blocking layer made of a black organic material may be added above the frame area 1 of the TFT array substrate 3. Since this blocking layer can be formed for blocking between each pixel 36 in the image display area 2 simultaneously with the formation of a black matrix of the black organic material on the TFT array substrate 3 side, the blocking ability for the frame area 1 can be further improved without increasing the number of manufacturing process steps.

Further, although tile present invention is applied to a TFT/LCD in the above described embodiment, it is, of course, not limited to that but is applicable to the blocking of the frame area of a display device in which the wirings are formed in a matrix form.

In addition, although the present invention has been described with respect to a transmission display device in the above embodiment, it is to be understood that it is not limited to that, but applicable to the frame area of a reflection display device.

As described above, in accordance with the present invention, the blocking and prevention of electrostatic failure for the frame area of the display panel in a liquid crystal display device can be simultaneously and effectively achieved, without increasing the number of manufacturing process steps.

What is claimed is:

1. A liquid crystal display device comprising:

a transparent substrate having a frame area defined around an image display area, a wiring layer consisting of a plurality of metal wirings extending over said frame area from said image display area and formed at predetermined intervals, an insulation layer formed on said wiring layer, and a plurality of island-like metal layers formed on said insulation layer between said adjacent metal wirings and having edge portions overlapping the edge portions of each of said plurality of metal wirings with a predetermined overlapping margin as viewed from a direction perpendicular to the surface of said transparent substrate.

2. A liquid crystal display device as set forth in claim 1, further comprising a semiconductor layer formed under said insulation layer so as to electrically contact said plurality of metal wirings.

3. A liquid crystal display device as set forth in claim 1 wherein said plurality of metal wirings are either data lines or gate lines, and said plurality of metal layers is formed out of the metal forming either of said data lines or said gate lines.

4. A liquid crystal display device as set forth in claim 1 wherein said overlapping margin has a width which is substantially identical to the overlapping precision in the manufacturing process.

5. A liquid crystal display device as set forth in claim 1 wherein a layer of a black organic material is added to said frame area.

6. A liquid crystal display device comprising:

a transparent substrate having a frame area defined around an image display area, a wiring layer consisting of a plurality of metal wirings extending over said frame area from said image display area and formed at first intervals, a plurality of first island-like metal layers formed between said plurality of metal wirings of said wiring layer in said frame area at second intervals between said adjacent metal wirings, an insulation layer formed on said wiring layer and said first metal layers in said frame area, a plurality of second island-like metal layers formed on said insulation layer on said plurality of metal wirings so as to connect to each of said plurality of metal wirings, and having edge portions overlapping the edge portions of each of said first metal layers with a predetermined overlapping margin as viewed from a direction perpendicular to the surface of said transparent substrate, and a semiconductor layer formed on said insulation layer so as to electrically contact said plurality of second metal layers.

7. A liquid crystal display device as set forth in claim 6 wherein said plurality of metal wirings are either data lines or gate lines, said first metal layers are formed out of the metal forming said plurality of metal wirings, and said second metal layers are formed out of the metal forming either said data lines or said gate lines.

* * * * *